United States Patent
Oshiro

(10) Patent No.: US 6,529,851 B1
(45) Date of Patent: Mar. 4, 2003

(54) METHOD FOR DETECTING DECREASE IN TIRE AIR-PRESSURE AND APPARATUS USED THEREFOR

(75) Inventor: Yuji Oshiro, Kakogawa (JP)

(73) Assignees: Sumitomo Rubber Industries, Ltd, Hyogo-ken (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/469,255

(22) Filed: Dec. 22, 1999

(30) Foreign Application Priority Data

Dec. 25, 1998 (JP) ............................. 10-369812

(51) Int. Cl.[7] .................... G06F 15/00; B60C 23/00
(52) U.S. Cl. .................. 702/148; 340/442; 340/444; 701/29; 701/36; 701/41; 701/72
(58) Field of Search ................. 702/145, 147, 702/148; 340/442, 444; 701/29, 36, 41, 72

(56) References Cited

U.S. PATENT DOCUMENTS

| | | | | |
|---|---|---|---|---|
| 5,578,984 A | * | 11/1996 | Nakajima | ............... 340/444 |
| 5,826,207 A | * | 10/1998 | Ohashi et al. | ............... 701/36 |
| 5,828,975 A | * | 10/1998 | Isshiki et al. | ............... 701/72 |
| 6,064,931 A | * | 5/2000 | Sawada et al. | ............... 701/41 |
| 6,137,400 A | * | 10/2000 | Yanase et al. | ............... 340/442 |

* cited by examiner

*Primary Examiner*—John S. Hilten
*Assistant Examiner*—John Le
(74) *Attorney, Agent, or Firm*—Birch Stewart Kolasch & Birch LLP

(57) ABSTRACT

An apparatus for detecting a decrease in internal pressure of a tire based on rotational information obtainable from tires attached to a four-wheeled vehicle equipped with a limited slip differential device is presented. The apparatus includes a way of correcting a turning radius or a reciprocal of the turning radius of driving wheels by calculating a shift amount. The shift amount is a difference between turning radiuses or a difference between reciprocals of turning radiuses, which is obtainable from the rotational information of driving wheels and following wheels. An accurate turning radius can be calculated for the driving wheels, which is not affected by the limited slip differential. Consequently, a decrease in the internal tire pressure can be properly judged in a vehicle that has a limited slip differential.

2 Claims, 4 Drawing Sheets

METHOD FOR DETECTING DECREASE IN TIRE AIR-PRESSURE AND APPARATUS USED THEREFOR

BACKGROUND OF THE INVENTION

The present invention relates to a method for detecting decrease in tire air-pressure and an apparatus used therefor. More particularly, the present invention relates to a method for detecting decrease in tire air-pressure and an apparatus used therefor capable of properly judging that decrease in internal pressure has occurred in any of tires attached to a vehicle equipped with a limited slip differential device (LSD) and generating. alarm accordingly.

It is conventionally known that a dynamic load radius of a tire becomes small in case an air-pressure of the tire has decreased, and that a rotational velocity or rotational angular velocity becomes faster than that of a tire having a normal air-pressure. For instance, there are proposed methods for detecting decrease in internal pressure based on relative differences of rotational angular velocities of tires (see, for instance, Japanese Unexamined Patent Publication No. 100620/1998, Japanese Unexamined Patent Publication No. 66714/1997, Japanese Unexamined Patent Publication No. 164720/1996 and Japanese Unexamined Patent Publication No. 145654/1996). Among these techniques, apparatus A as recited in Japanese Unexamined Patent Publication No. 100620/1998 is so arranged that in case it is judged that a wheel of decreased pressure is one of following wheels when the vehicle is running on a comer, a turning radius is introduced from a rotational angular velocity of the driving wheels, acceleration in a lateral direction (hereinafter called "lateral G") at the time of running on a corner is calculated from the turning radius, and a judgement value is calculated on the basis of a lateral G including no errors by using a specified threshold.

However, among recent vehicles, there are some which are equipped with a limited slip differential device at a differential gear of a driving shaft for the aim of improving running performance at the time of, for instance, cornering. The mechanism of the limited slip differential device is so arranged that differential is restricted until a differential torque exceeds a set value, and the driving wheels are rotated at identical velocities on the right and left. Therefore, in a vehicle equipped with such a mechanism, a rotational angular velocity at an outer side of turning becomes slower than an essential rotational angular velocity due to influences of the limited slip differential device so that the turning radius is calculated to be larger than it actually is. Consequently, errors occur in judgement values so that decrease in internal pressure cannot be properly judged.

The present invention has been made in view of these facts, and it is a purpose of the present invention to provide a method for detecting decrease in tire air-pressure and an apparatus used therefor capable of properly judging decreases in internal pressure of a tire in a vehicle equipped with a limited slip differential device.

SUMMARY OF THE INVENTION

In accordance with the present invention, there is provided an apparatus for detecting decrease in tire air-pressure for detecting decrease in internal pressure of a tire based on rotational information obtainable from tires attached to a four-wheeled vehicle equipped with a limited slip differential device, wherein. the apparatus includes a shift amount calculating means for correcting a turning radius or a reciprocal of the turning radius of driving wheels by using a shift amount which is a difference between turning radiuses or a difference between reciprocals of turning radiuses obtainable from the rotational information of driving wheels and following wheels.

In accordance with the present invention, there is further provided a method for detecting decrease in tire air-pressure for detecting decrease in internal pressure of a tire based on rotational information obtainable from tires attached to a four-wheeled vehicle equipped with a limited slip differential device, wherein the method includes the steps of introducing a difference between turning radiuses or a difference between reciprocals of turning radiuses obtainable from the rotational information of driving wheels and following wheels, performing correction by using the difference between turning radiuses or the difference between reciprocals of turning radiuses as a shift amount for the turning radiuses or reciprocals of the turning radiuses of the driving wheels, and thereafter judging decrease in internal pressure of a tire.

DETAILED DESCRIPTION

The apparatus and method for detecting decrease in tire air-pressure according to the present invention will now be explained based on the accompanying drawings.

Figure 1:
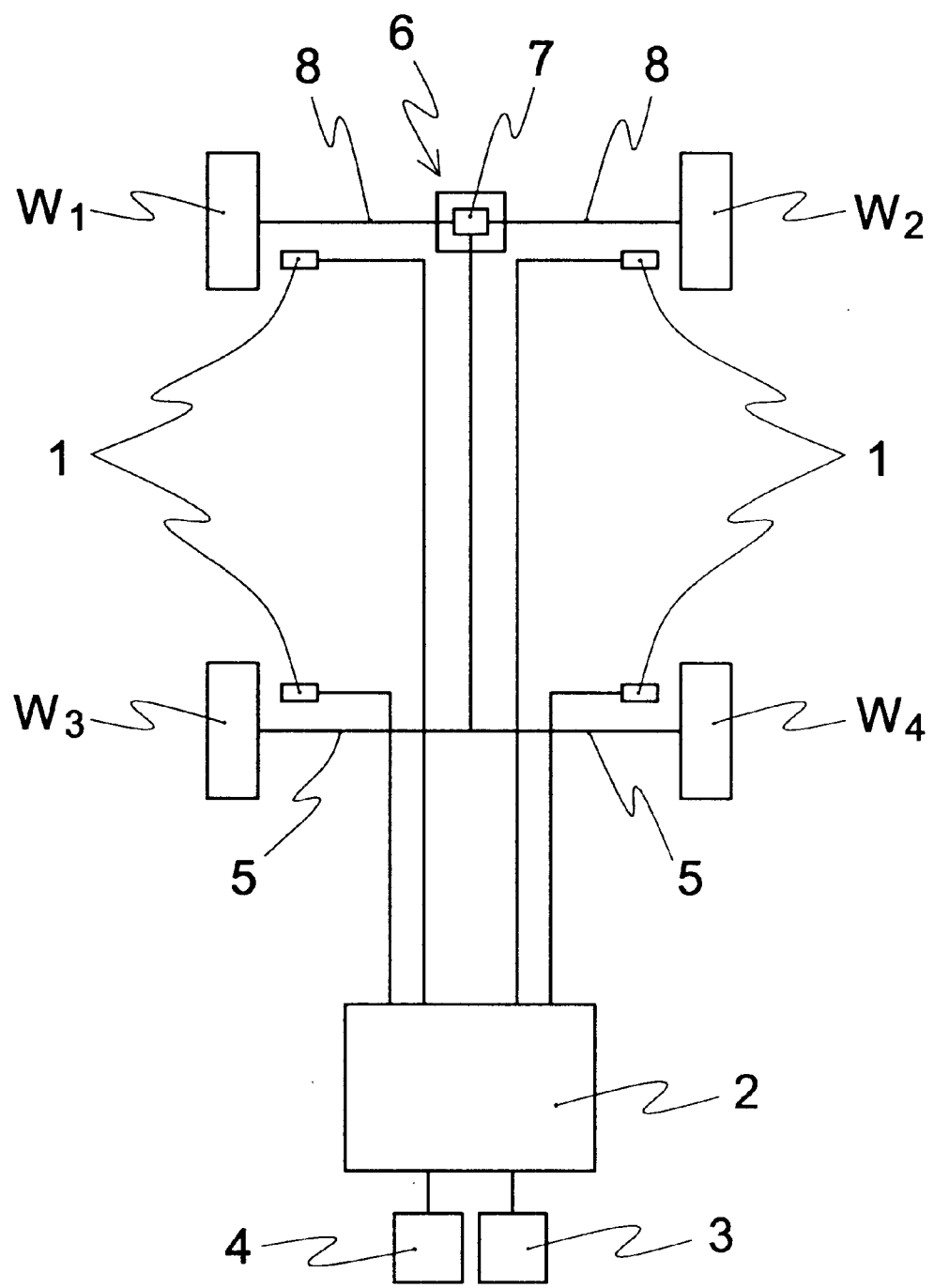
FIG. 1 is a block diagram showing one embodiment of the apparatus for detecting decrease in tire air-pressure according to the present invention.
Figure 2:
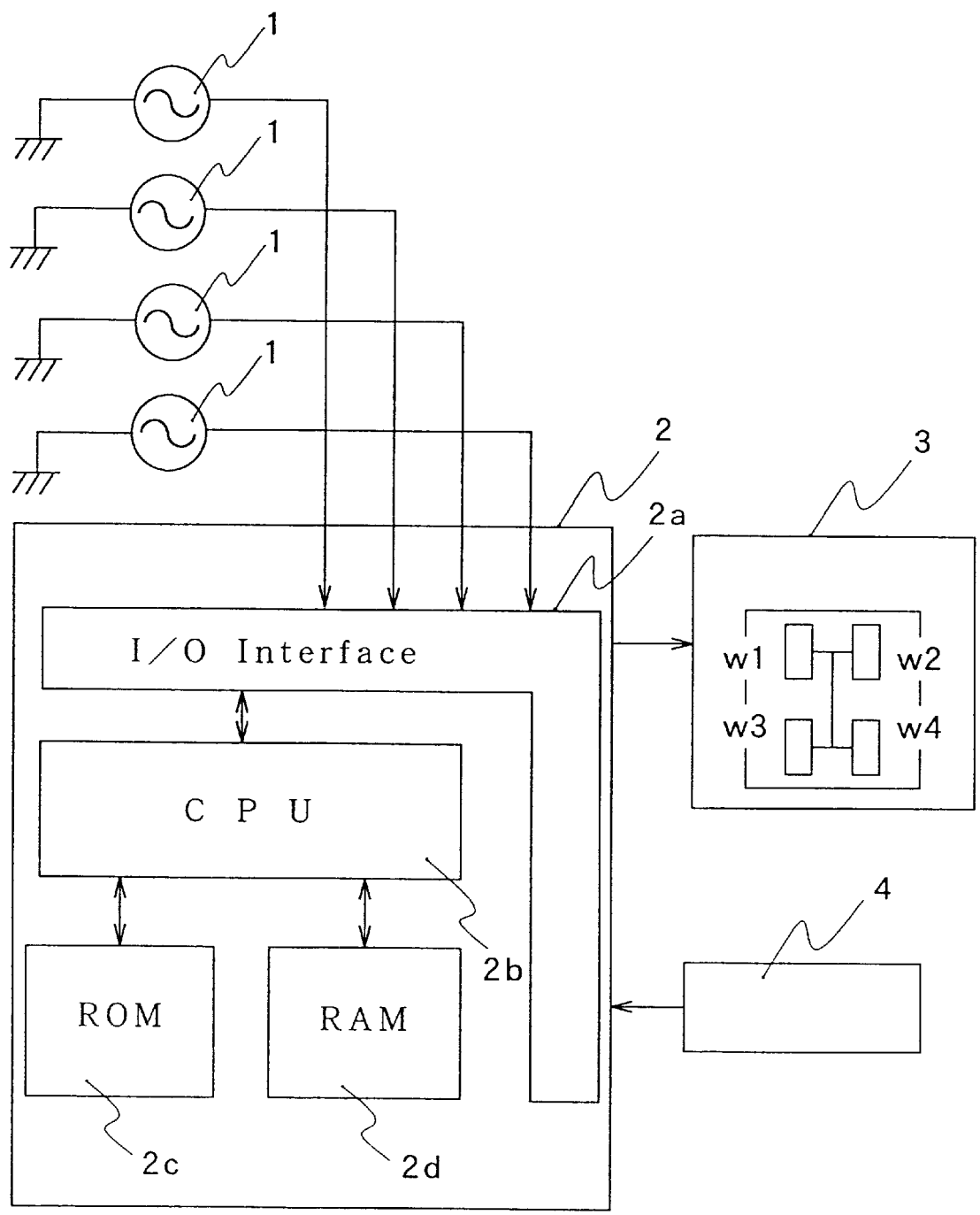
FIG. 2 is a block diagram showing electric arrangements of the apparatus for judging decrease in tire air-pressure of FIG. 1.

As shown in FIG. 1, the apparatus for detecting decrease in air-pressure is designed to judge whether an air-pressure of any of four wheels $W_1$, $W_2$, $W_3$ and $W_4$ of driving wheels and following wheels attached to a four-wheeled vehicle has decreased or not, and comprises ordinary wheel velocity sensors 1 which are respectively provided in connection with each of the tires $W_1$, $W_2$, $W_3$ and $W_4$ as well as a control unit2. Each wheel velocity sensor 1 detects a rotational information of each tire such as number of rotation, rotational velocity and rotational angular velocity. Outputs of the wheel velocity sensors 1 are supplied to the control unit 2. To the control unit 2, there are connected a display 3 comprising a liquid crystal display device, a plasma display device, or CRT for notifying a tire $W_1$, $W_2$, $W_3$ and $W_4$ of which air-pressure has decreased, and a switch SW4 which might be operated by the driver. As shown in FIG. 2, the control unit 2 comprises an I/O interface 2a required for sending/receiving signals to/from an external device, a CPU 2b which functions as a center of calculation, a ROM (memory device for read out only) 2c which stores a control operation program for the CPU 2b, and a plurality of RAMs (isokinetic random access memory devices) 2d into which data are temporarily written and from which data are read out when the CPU 2b performs control operations.

The four-wheeled vehicle according to the present embodiment is a FF (front engine-front drive) vehicle, and is equipped with a limited slip differential device 7 at a differential gear 6 of a driving shaft 8. Note that 5 denotes a following shaft.

In this embodiment, each wheel velocity sensor 1 serves as a rotational information detecting means, and the control unit 2 includes shift amount calculating means, lateral G calculating means, and judging means. The shift amount calculating means stores as a shift amount a difference between turning radiuses or a difference between reciprocals of turning radiuses obtainable from the rotational information of driving wheels and following wheels, and performs correction. The judging means performs correction by using the difference between turning radiuses or the difference between reciprocals of turning radiuses as a shift amount for the turning radiuses or reciprocals of the turning radiuses of the driving wheels, and thereafter judges decrease in internal pressure of a tire.

The shift amount calculating means and judging means in the present invention will now be explained in case a difference between two diagonal sums is defined to be a judgement value D.

That is, the judgement value D can be obtained from the following equation (1).

$$D = \frac{\frac{F11+F14}{2} - \frac{F12+F13}{2}}{\frac{F11+F12+F13+F14}{4}} \quad (1)$$

Here,
F1(X): rotational angular velocity of wheel (tire)
X: 1=front left tire, 2=front right tire, 3=rear left tire, 4=rear right tire.

In the conventional apparatus A, errors might be included in the rotational angular velocity F1(x), depending on the size of velocity V of the vehicle (V1(X)/4), a first turning radius R of vehicle, and acceleration in forward and rear directions FRA of each of the wheels. Thus, the first turning radius Ro of the vehicle can be calculated from the following equations (2) and (3) by performing correction of influences of load shift to a turning radius Ra of the vehicle which has been calculated based on the velocity $V1_3$, $V1_4$ of the following wheels $W_3$, $W_4$.

$$Ra = \frac{TW}{2} \times \frac{V1_3 + V1_4}{V1_3 - V1_4} \quad (2)$$

$$Ro = Ra \times \left(1 + \frac{2 \times Po \times V}{TW \times 9.8}\right) \quad (3)$$

Here, TW denotes a tread width which is a length between the following wheels $W_3$, $W_4$, V a speed of the vehicle, and Po a constant which is preliminarily stored in the ROM 2c.

It is then judged whether the rotational angular velocity F1(X) which has been calculated at a judging period ΔT is to be rejected or not, while the first turning radius Ro which is one of parameters used for rejection is calculated on the basis of the velocity $V1_3$, $V1_4$ of the following wheels $W_3$, $W_4$. However, in case the air-pressure is decreased in either one of the following wheels $W_3$, $W_4$, the calculated first turning radius Ro includes errors so that no correct value can be obtained.

Due to this fact, an estimation process is then performed on the basis of a ratio between each of the velocities $V_1$, $V_2$ of the driving wheels $W_1$, $W_2$, a ratio between each of the velocities $V_3$, $V_4$ of the following wheels $W_3$, $W_4$, and a difference between these ratios in order to confirm whether the first turning radius Ro of the vehicle is correct or not. In this estimation process, it is judged whether it has been estimated that the air-pressure of either of the following wheels $W_3$, $W_4$ has decreased or not. In case it is judged that it has been estimated that the air-pressure of either of the following wheels $W_3$, $W_4$ has decreased, it is judged that errors are included in the previously obtained first turning radius Ro, and a second turning radius R is obtained on the basis of the velocities $V1_1$, $V1_2$ of the driving wheels $W_1$, $W_2$, similarly to the equation (2) which is a method for calculating the first turning radius Ro. With this arrangement, it is enabled to obtain a correct turning radius of the vehicle which is not affected by decreases in air-pressure.

Based on the correct second turning radius R, it is then judged whether the rotational angular velocity F1(X) is to be rejected or not. Since lateral G of the vehicle which is proportional to the speed V of the vehicle and is in reverse proportion to the second turning radius R of the vehicle will be a large factor, the lateral G of the vehicle is calculated on the basis of the following equation (4) which utilizes the second turning radius R of the vehicle.

$$\text{lateral} G = V^2/(R \times 9.8) \quad (4)$$

The reason for introducing 9.8 as a denominator is for performing g calculation of lateral G. Thereafter, it is judged whether the calculated lateral G of the vehicle satisfies the following equation (5) or not.

$$|\text{lateral} G| > GTH (\text{e.g. } GTH=0.4 \text{ g}) \quad (5)$$

In case this equation (5) has been satisfied, it is judged that errors are included in the rotational angular velocity F1(X), and the rotational angular velocity F1(X) is rejected. On the other hand, in case the above equation (5) is not satisfied, it is judged that no errors are included in the rotational angular velocity F1(X), and a judgement value D is calculated based on equation (1).

In a vehicle equipped with a limited slip differential device, the mechanism functions to restrict differentials until the differential torque exceeds a set value, whereby the rotational angular velocity at an outer side of turning becomes slower than a rotational angular velocity of a vehicle which is not equipped with a limited slip differential device, so that the turning radius is calculated to be larger than it actually is.

Thus, the present invention is characterized by performing correction of the turning radius which is calculated to be larger than it actually is when obtaining the turning radius from the driving wheels, so that a correct turning radius can be obtained.

Figure 3:
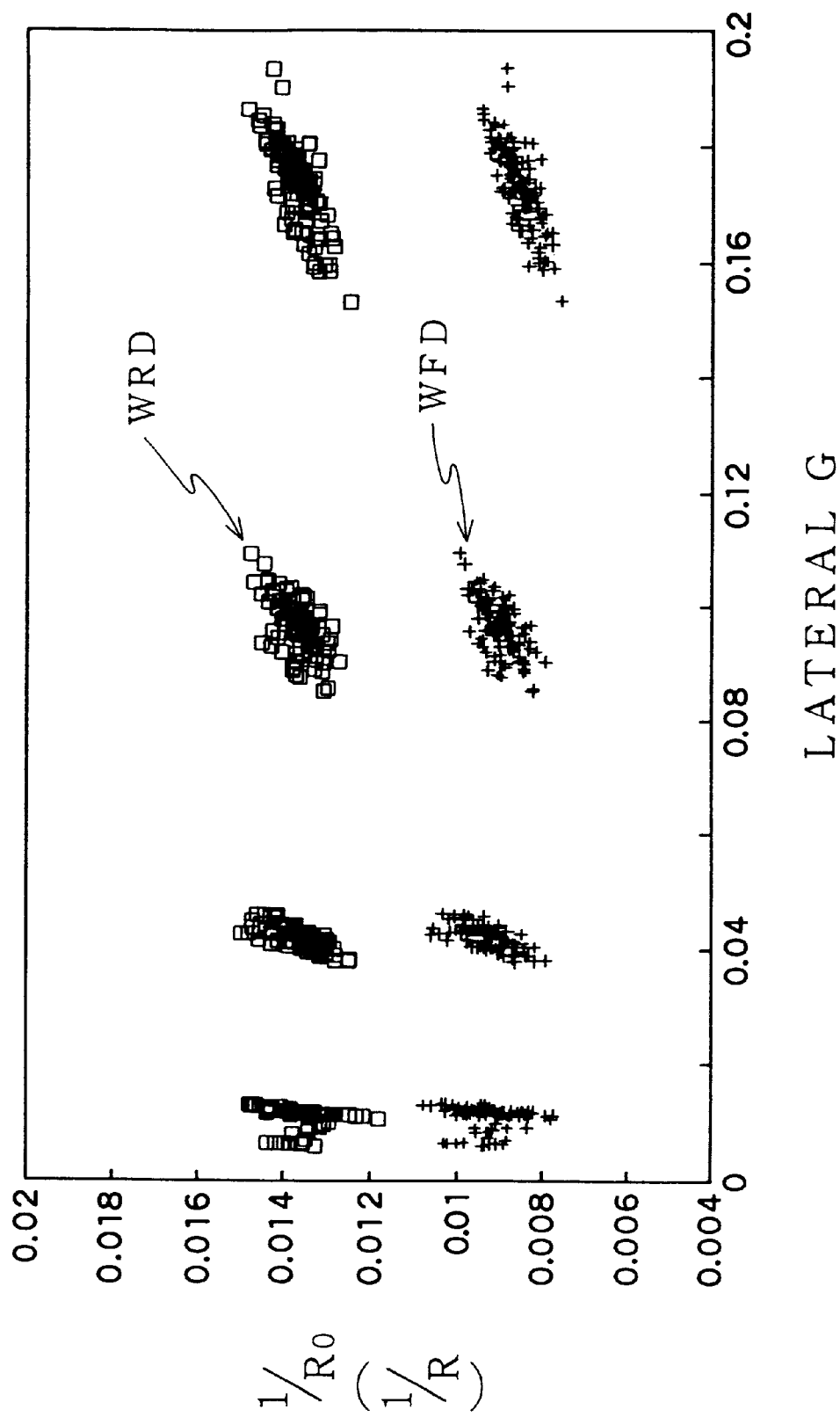
FIG. 3 is a view showing a relationship between reciprocals of turning radiuses and lateral G which are respectively obtained from following wheels and driving wheels of a vehicle equipped with a LSD.

That is, in the present embodiment, by using a vehicle which is equipped with a limited slip differential device and to which tires (having a size of 225/45ZR17) each preliminarily made to assume a normal air-pressure (2.6 kgf/cm²) are attached (hereinafter called "vehicle equipped with LSD"), turning movements to the left are performed at a radius of 70 R at respective speeds of 20 km/h, 40 km/h, 60 km/h and 80 km/h. Reciprocals of turning radiuses which have been respectively obtained from the following wheels and driving wheels based on wheel velocity data are as shown in FIG. 3. Note that the number of points for measurement at each of the velocities is not less than 30.

As is evident from FIG. 3, the reciprocal 1/R of the turning radius R which has been introduced from the driving wheel WFD is shifted by 0.004 from the reciprocal 1/Ro of the turning radius Ro which has been introduced from the follower wheel WRD. Thus, by defining this value of 0.004 as a shift amount (constant) α and adding this to the reciprocal 1/R of the turning radius R which has been introduced from the driving wheel WFD, the value can be made to approach the reciprocal 1/Ro of the turning radius Ro of the following wheel.

Figure 4:
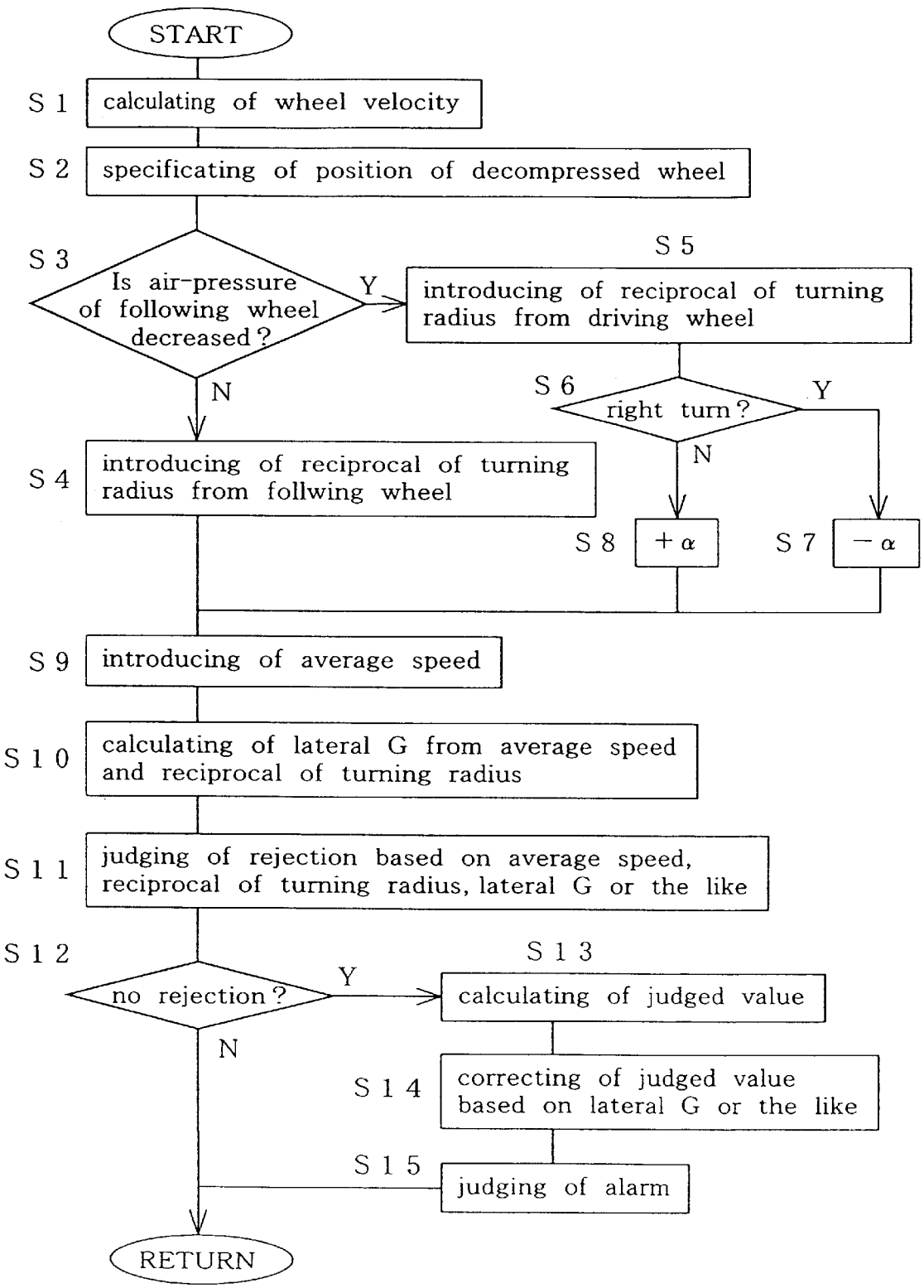
FIG. 4 is a flow chart.

Therefore, the following steps as shown in FIG. 4 are performed in the present embodiment: after performing calculation of wheel velocities and specification of a position of a decompressed wheel (Steps S1, S2), estimation (judement) is made whether the air-pressure of the following wheels has decreased or not (Step S3). In case the air-pressure of the following wheels has not decreased, a turning radius is introduced from the following wheels (Step S4), and in case the air-pressure of the following wheels has decreased, a reciprocal of a turning radius is introduced from the driving wheels (Step S5). It is then judged whether the turn is a right turn or not (Step S6), and if it is a right turn, 0.004 is decremented as the shift amount (constant) α (Step S7), and if it is not a right turn, 0.004 is incremented as the shift amount (constant) α (Step S8). After introducing an average speed (Step S9), a lateral G is calculated from the average speed and the reciprocal of the turning radius of the driving wheels (Step S10). Based on these calculated values, it is judged whether the rotational angular velocity is to be rejected or not (Step S11). In case nothing is to be rejected (Step S12), the judgement value is calculated (Step S13). Correction of the judgement value is performed for eliminating influences of variable factors including lateral G or slip rate (Step S14) to consequently perform judement processes whether alarm is to be generated or not (Step S15). It should be noted that the slip rates are preliminarily calculated and stored in the RAM.

In this manner, by performing correction of the reciprocal of the turning radius calculated from the driving wheels by using a shift amount (constant), decrease in internal pressure of a tire can be properly judged even in a vehicle which is equipped with a limited slip differential device. It should be noted that the shift amount (constant) differs from vehicle to vehicle, and this amount can be obtained at the time of performing tuning. Further, while the difference between reciprocals of turning radiuses of driving wheels and following wheels is set to be the shift correction amount in the present embodiment, the present invention is not limited to this, and it is also possible to define the shift correction amount to be a difference between turning radiuses of driving wheels and following wheels.

As explained so far, in case of obtaining a turning radius from driving wheels of an actually running vehicle which is equipped with a limited slip differential device (LSD), the difference between turning radiuses or difference between reciprocals of turning radiuses calculated from following wheels and driving wheels which have been obtained with the tires being at normal pressure is set to be a shift amount used for correction, thereby calculating an accurate turning radius for the driving wheels which is not affected by the LSD. Consequently, decrease in internal pressure can be properly judged also in a vehicle that is comprised with a LSD.

What is claimed is:

1. An apparatus for detecting decrease in tire air-pressure for detecting decrease in internal pressure of a tire based on rotational information obtainable from tires attached to a four-wheeled vehicle equipped with a limited slip differential device, wherein the apparatus includes a shift amount calculating means for correcting a turning radius or a reciprocal of the turning radius of driving wheels by using a shift amount which is a difference between turning radiuses or a difference between reciprocals of turning radiuses obtainable from the rotational information of driving wheels and following wheels; a means for calculating acceleration in a lateral direction on the basis of the turning radius or the reciprocal of the turning radius corrected by the shift amount; and a judging means for judging rejection of the rotational information based on the acceleration in the lateral direction calculated by the means for calculating acceleration in the lateral direction and for judging decrease in internal pressure of a tire to give a judgment value wherein the judgment value is corrected with the use of lateral G.

2. A method for detecting decrease in tire air-pressure for detecting decrease in internal pressure of a tire based on rotational information obtainable from tires attached to a four-wheeled vehicle equipped with a limited slip differential device, wherein the method includes the steps of introducing a difference between turning radiuses or a difference between reciprocals of turning radiuses obtainable from the rotational information of driving wheels and following wheels; performing correction by using the difference between turning radiuses or the difference between reciprocals of turning radiuses as a shift amount for the turning radiuses or reciprocals of the turning radiuses of the driving wheels; calculating acceleration in the lateral direction on the basis of the turning radius or the reciprocal of the turning radius corrected by the shift amount; judging rejection of the rotational information based on the acceleration in the lateral direction; and thereafter judging decrease in internal pressure of a tire to give a judgment value wherein the judgment value is corrected with the use of lateral G.

* * * * *